Figure 1:
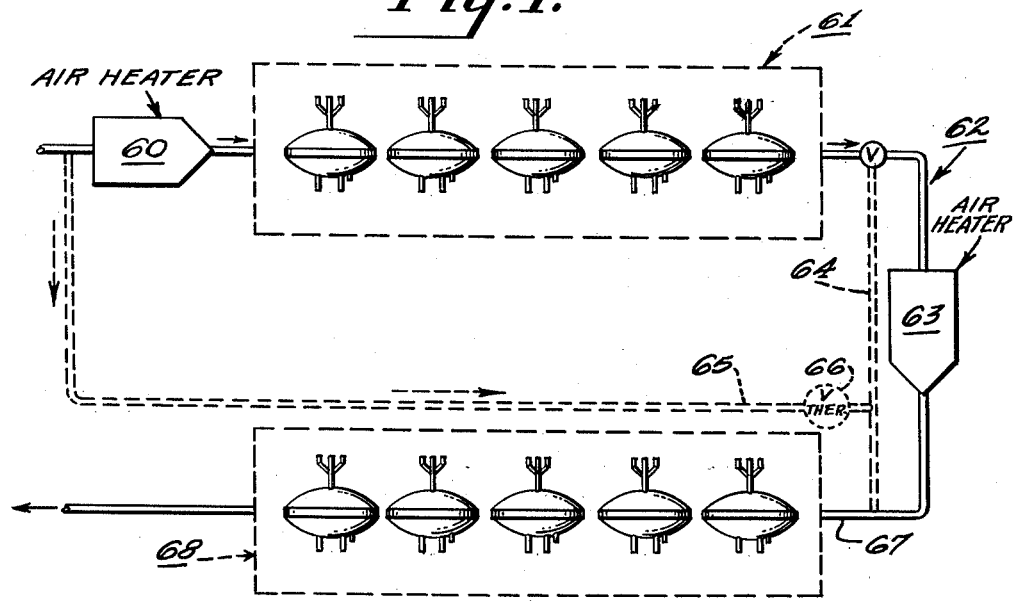

Dec. 1, 1959  B. BUSCH-PETERSEN ET AL  2,915,570
REGENERATION OF BUTADIENE CATALYST
Filed Oct. 17, 1956

INVENTORS.
Bent Busch-Petersen,
Julian J. Cicalese &
Robert G. Craig
BY
John R. Ewbank
ATTORNEY.

United States Patent Office 2,915,570
Patented Dec. 1, 1959

2,915,570

REGENERATION OF BUTADIENE CATALYST

Bent Busch-Petersen, Clifton Heights, and Julius J. Cicalese, Drexel Hill, Pa., and Robert G. Craig, Wilmington, Del., assignors to Houdry Process Corporation, Wilmington, Del., a corporation of Delaware Application October 17, 1956, Serial No. 616,463

Claims priority, application Great Britain October 17, 1955

4 Claims. (Cl. 260—680)

This invention relates to the regeneration of catalyst in apparatus adapted for the dehydrogenation of hydrocarbons and particularly to the regeneration of catalyst of the type employed in the manufacture of butadiene from $C_4$ hydrocarbons.

Heretofore butadiene has been prepared by the passage of butane over a catalyst consisting of a minor amount (e.g., 20%) of chromia in a larger amount of gamma alumina. Gamma alumina is alumina having a large surface area and containing, per mol of alumina, at least a trace, but less than one-half mol of chemically combined water. By suitable severity of treatment at elevated temperatures, gamma alumina is converted to alpha alumina. The severity of conditions necessary for bringing about the gamma to alpha alumina transformation is less by reason of the presence of chromia. Alpha chromia-alumina has only a small fraction of the dehydrogenation catalytic activity of gamma chromia on alumina catalyst. Accordingly, the chromia on alumina dehydrogenation catalyst desirably should be protected from excessive temperatures (or other severe conditions) during the periodic regeneration of the catalyst in order to achieve an acceptable stability of the catalyst.

The passage of hot $C_4$ hydrocarbons over a preheated chromia on alumina catalyst brings about the formation of butene and butadiene, cools the catalyst, and deposits a very small amount of coke upon the catalyst. After a period of operation, the temperature pattern through the catalyst bed is unfavorable to further butadiene manufacture. In order to restore a favorable temperature pattern to the catalyst bed again and to remove the coke by combustion, the catalyst is periodically regenerated. Just prior to regeneration, the entry portion of the catalyst bed is coolest but the exit portion of the bed contains the most coke and hence becomes hottest from the combustion, thus making it difficult to utilize the heat of the combustion of the coke for restoring the desired temperature pattern. It has been customary to burn many tons of fuel per day to heat the air employed for conditioning the temperature pattern of the catalyst bed during such catalyst regeneration.

This necessity for providing large amounts of fuel for conducting the regeneration operation in a dehydrogenation plant contrasts greatly with the regeneration procedures in a cracking unit. The regeneration of a cracking catalyst involves the combustion of such a relatively large amount of coke that it provides heat for other operations in the refinery. Thus, the decoking of cracking catlyst contributes fuel value to a refinery in contrast to the fuel consumption for the regeneration of dehydrogenation catalysts. Butadiene is prepared in a battery of reactors. The regeneration is conducted in rotation among the various reactors, and whether one reactor begins regeneration before, at, or after the termination of regeneration in the previous reactor depends upon the operating cycle required in the particular installation. Heretofore the effluent from the regeneration zone has passed through a waste-heat boiler and thence to the stack. Thus, the heat value of the fuel burned to regenerate the catalyst has been utilized to some extent. The burning of the coke on the catalyst has released about as much heat as required to maintain the catalyst bed at operating temperature, but the necessity for the consumption of the auxiliary fuel has been a criticized feature of such regeneration system.

The manufacture of butadiene from $C_4$ hydrocarbons has been economical only in very large units processing millions of cubic feet of gases per day. Compressors suitable for processing large volumes of gas for the regeneration system heat such gas more than 100° F. Inasmuch as the catalyst bed is operated at a temperature of about 1150° F., the effluent from the regeneration zone, if compressed without any cooling whatsoever, might be heated to a temperature of the magnitude of 1600° F. in the compressor. There would be a prohibitive cost in adapting a compressor to withstand such temperatures. There would also be an excessive expense in cooling the regeneration effluent to the temperature of conventional recirculation systems, such as 600° F., compressing the thus cooled gas, and reheating the compressed gas stream to an operating temperature such as 1150° F. Only by operating the compressor at a temperature tolerated by ordinary materials of construction (e.g. mild steel plate) and minimizing the need for excessive investment in heat exchangers for the gas supplied to the compressor is it economical to compress the effluent from a butadiene catalyst regeneration zone.

In accordance with the present invention, the effluent from a regeneration zone is adjusted in order that its temperature and oxygen content are suitable for use in a regeneration zone subsequently, thereby conserving the sensible heat of such regeneration effluent. In certain embodiments of the present invention, the effluent from the regeneration in one battery of dehydrogenation vessels is employed as a part of the gas directed to the regeneration zone in a second battery of dehydrogenation vessels. In another embodiment of the present invention the heat conservation is accomplished by the recycling of effluent from a regeneration zone to either the same regeneration zone or to a regeneration zone of the same battery of dehydrogenation vessels. In any event, some of the gases are eventually sent to a waste heat boiler and thence to the stack. The flow of the hot gases is so controlled that the effluent from a regeneration zone is utilized immediately instead of being stored for use many minutes later in a subsequent regeneration operation. By reason of the reuse of the heat of the effluent from the regeneration zone, a smaller amount of fuel is necessary for the regeneration operation than has been customary.

Figure 2:
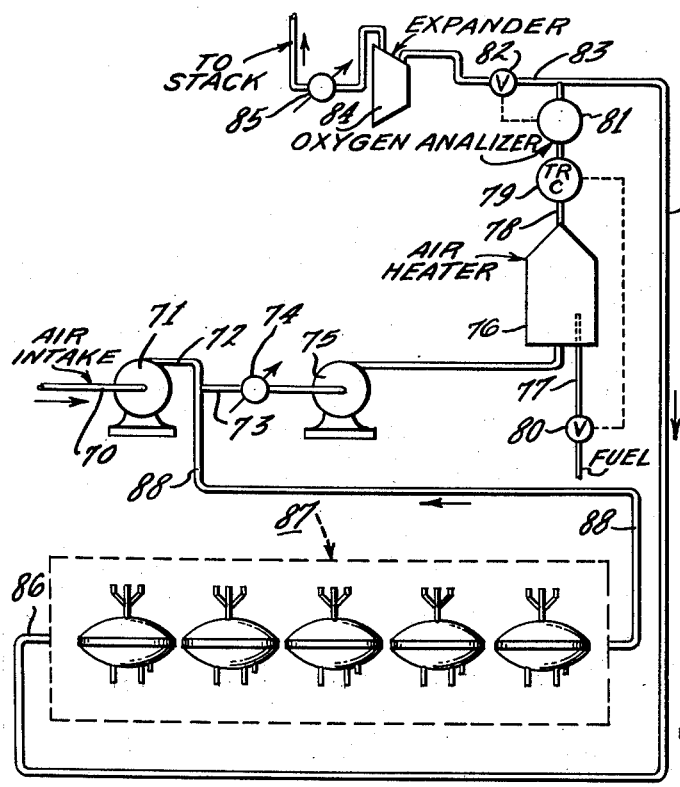

In the drawing, Fig. 1 is a schematic diagram of an embodiment of the invention utilizing two batteries of converters. Fig. 2 is a schematic diagram of an embodiment of the invention recirculating regeneration gases.

In Fig. 1 there is shown a schematic diagram of a system for conserving the heat in the effluent from the regeneration operation. A supply of air is passed through an air heater 60 and thereby heated to a suitable temperature, say about 1150° F. prior to the passage of the air into a bed of contact mass in a regeneration zone 61. During the initial portion of the passage of the air through the contact mass any carbonaceous deposit distributed in the catalyst and/or inert material is burned, thereby slightly increasing the temperature of the regeneration media. During the remaining portion of the regeneration period, the preheated air serves as a heat transfer media to bring about a desirable temperature pattern across the bed containing catalyst.

The effluent gas from regeneration, when operating in adiabatic cycle, will be at approximately the temperature of the inlet stream, and depending upon the exact operating conditions and the coke content of the catalyst, may be somewhat higher or lower than the inlet temperature by generally no more than about 10° F., or by ±25° F. at the most.

The gas stream leaving the regeneration zone 61 is passed through a temperature adjustment zone 62 in which the gas stream is adjusted to a temperature suitable for use in a subsequent regeneration zone. A second battery of converters may be operated at a different temperature for reasons such as differences in the age of the catalyst, but the operation is more readily understood when described for installations employing the same temperature in batteries of reactors. Any necessary temperature adjustment of the effluent from the first battery may be achieved by using inexpensive equipment. An air heater or exchanger 63 can be of a relatively small capacity, inasmuch as it is necessary to heat the gas stream only to the extent of increasing slightly the already elevated temperature. A thermostatic valve controls the proportion of the effluent from the regeneration zone 61 which passes through the air heater 63, the balance being directed through a bypass line 64. Under those conditions in which the gas is directed entirely through the bypass line at a temperature greater than the temperature of the inlet to the regeneration zone, there is admixed with such hot gas stream a controlled amount of fresh air supplied through a small fresh air line 65. A thermostatic valve 66, responsive to the temperature of the hot gas in the bypass line 64, regulates the amount of fresh air mixed with the effluent from the regeneration zone.

In this manner there is prepared for introduction in line 67, a gas mixture containing controlled proportions of gases from one or more of the sources, the air heater 63, the bypass line 64 and the fresh air line 65. Of particular importance, the temperature of the gas in the line 67 can be thus regulated to be substantially the same as the temperature of the air stream entering the regeneration zone 61 or if the other battery is operating at a different temperature, then at such predetermined temperature.

A second regeneration zone 68, such as in a second battery of reaction vessels operated in parallel with the reaction vessels of the regeneration zone 61 receives the gas stream from the line 67 and utilizes its heat content in a manner similar to that in which the heat content of the air is utilized in the regeneration zone 61.

By reason of the fact that the butadiene manufacturing method of the present invention is operated on a relatively short cycle, the carbonaceous deposit constitutes only a small portion of the bed of contact mass in the reaction vessels. Thus, the carbonaceous deposit is ordinarily less than 1% and is always less than about 3% by weight of the contact mass. Relatively large volumes of air are directed through the contact mass with the result that only a relatively small portion of the oxygen content of the air is consumed in the combustion of the carbonaceous deposit. Accordingly, the hot gas stream leaving the regeneration zone 61 during most of the regeneration period contains sufficient oxygen to be quite useful in the regeneration zone 68. During that portion of the regeneration period in which the largest amounts of carbon dioxide are formed, the largest amounts of fresh air are introduced into the gas mixture in line 67 by reason of the slightly higher temperature of the gas in the bypass line 64. In this manner, a gas stream containing adequate oxygen and regulated to the correct temperature is provided for the regeneration zone 68, notwithstanding the use of only a minimum amount of fuel for the operation of the air heater 63 and/or a minimum amount of heat transfer fluid if an air heat exchanger 63 is employed.

In directing the effluent from the regeneration zone of one battery to the regeneration zone of another battery, a high temperature compressor may be employed but is not necessary. Instead, prior to initial heating, the air may be compressed to a high enough pressure to flow through both batteries. The cycle of processing steps is such that although each reactor is regenerated only periodically, there is in each battery of reactors at least one reactor undergoing regeneration during all portions of the normal operation.

In the embodiment shown in Fig. 2, in which regeneration gases are recirculated, a compressor adapted to withstand elevated temperatures above 1000° F. is employed, thereby making it feasible to supply to such circulator gases at a temperature of above 1000° F. Because the gases fed to the circulator are not cooled below 1000° F., the heat exchange difficulties are greatly simplified. Fresh air may be fed through line 70 to a compressor 71 to provide a compressed air stream injectable through line 72 into a mixing zone in which there is formed a gas mixture. This mixture flows through line 73 to a heat exchanger 74 in which the mixture is cooled only slightly and not below 1000° F., thus eliminating the heat exchange difficulties involved in cooling gases to a low temperature such as 300° F. prior to entering the recirculating compressor. The thus adjusted hot gas mixture flows to the high temperature compressor 75 adapted to operate at a temperature such as 1100° F. The thus heated compressed gases are adjusted to the desired temperature (about 1200° F.) in an air heater 76, as a result of the combustion of a minor amount of fuel injected from high pressure fuel line 77. The effluent stream 78 from the heater has the pressure, temperature, rate, oxygen content and other characteristics desired in the regeneration zone, and suitable measurements are made and suitable controls are effected to achieve this. The measurements and controls may be manual and/or automatic and may be constant and/or periodic, but are schematically shown as constant and automatic. A temperature responsive control 79 in stream 78 can actuate a valve 80 in fuel line 77, thereby regulating the amount of fuel introduced into stream 76, thus maintaining the stream 78 at the desired temperature. An oxygen concentration responsive device 81 in stream 78 controls the operation of the fresh air compressor 71 and also controls a valve 82 in withdrawal line 83. If the oxygen concentration in stream 78 is excessively low at the oxygen responsive device 81, more gas will go through valve 82 in the withdrawal line 83, and more fresh air will be compressed by the compressor 71 and introduced into the regeneration system, thus maintaining the oxygen concentration in the stream 78 substantially constant and at the desired level. If desired, supplemental controls can adjust the amount of gas sent to the stacks to correspond substantially to the air intake. By such arrangements, the amount of gas in the recirculating system is maintained at a substantially constant amount, notwithstanding the opportunities for automatic adjustment of several variables. Thus, it is feasible to recycle gas for regeneration at temperatures of the magnitude of 1100° F., greatly in excess of the temperature of gases recycled in cracking catalyst regeneration systems. Although such recycling of regeneration gases involves increased capital investment in piping and related equipment, the fuel economy thereby achieved makes the process attractive especially in areas in which cheap fuel is not available. Moreover, the butane dehydrogenation step is improved, there being better catalyst life, better catalyst activity, and better selectivity for butadiene. The more precise control of the temperature patterns during regeneration of the chromia on gamma alumina catalyst makes the catalytic dehydrogenation portion of the cycle approach more nearly its theoretical potentialities.

In some embodiments of the invention, the gases throughout most of the regeneration systems are maintained at superatmospheric pressure, such as about 4 atmospheres at the inlet to the reactor. This superatmospheric pressure provides greater weight of gas. The greater heat capacity of the superatmospheric gas stream makes it possible to establish the desired temperature patterns in the bed in a more satisfactory manner.

The superatmospheric pressure makes it feasible, during the short period of regeneration, to pass through the catalyst bed a weight of hot gas having a heat capacity (mass times specific heat) of about 40% of the heat capacity of the catalyst bed instead of using merely a weight of hot gas having a heat capacity of about 20% of the heat capacity of the catalyst bed. Superatmospheric pressure also permits appropriate adjustment of the operating cycle for more efficient utilization of the catalyst beds for the dehydrogenation reactions.

In order to reduce the operating costs of the superatmospheric regeneration system, it is generally desirable to operate an expander turbine 84 to obtain power from the high pressure gas in the withdrawal line 83. Similarly, a waste heat boiler or other suitable heat exchanger 85 extracts the economically available heat content of the gases sent to the stack.

The gas stream 78 after passing through the temperature responsive control 79 and the oxygen analyzer, and after the withdrawal of the gases for the stack through line 83, passes through line 86 to the battery 87 of reactors, serving to regenerate a catalyst bed by adjusting its temperature pattern and burning the deposited coke. The effluent from the battery 87 of reactors passes through recirculation line 88 to the mixing zone, where it is mixed with compressed fresh air in line 72 to form the mixture 73 which enters the recirculator 75 at a temperature of at least about 1000° F. by reason of the advantageous operation of the heat exchanger 74. Because the recirculator operates at a temperature above 1000° F., the amount of fuel required by the air heater 76 for preparing the regeneration gas mixture for line 86 is effectively reduced.

In any system involving recycling of combustion products in admixture with air, the oxygen concentration of the mixture is less than the 21% concentration in air. In some embodiments, the oxygen concentration of the stream going to the regeneration system is maintained at about 9% in order to burn most of the coke during an initial fraction of the regeneration period, and in order to maintain a uniform ratio of about 8 to 1 for recycle gas to fresh air. In preferred embodiments, the amount of oxygen in the total gas volume passing through the reactor is between about 2 and about 4 times that required for the combustion of the coke. In view of such factors as the period of dehydrogenation, period of regeneration, regeneration pressure, and gas velocity, the oxygen concentration may be between about 1% and about 6% in some embodiments of the present invention, thus providing from about 2 to 4 times the theoretical oxygen requirements.

In either that embodiment shown in Fig. 1, involving the utilization of regeneration gas in two successive batteries of reactors, or in that embodiment shown in Fig. 2, involving the recirculation of a major portion of the effluent from a regeneration zone, the effluent from a regeneration zone undergoes a minor adjustment of temperature and a minor adjustment of oxygen content to bring the gas to the inlet temperature and inlet oxygen content for utilization for subsequent regeneration of a paraffin dehydrogenation catalyst bed.

Obviously many modifications and variations of the invention as hereinbefore set forth may be made without departing from the spirit and scope thereof, and therefore only such limitations should be imposed as are indicated in the appended claims.

What is claimed is:

1. In a process for dehydrogenating $C_4$ hydrocarbons over chrome-alumina catalyst in a plurality of catalyst reactors operating in timed sequence, including alternating periods of hydrocarbon conversion and catalyst regeneration, wherein at any instant at least two of said reactors are on regeneration, the method for regenerating said catalyst which comprises: passing a preheated fresh stream of oxygen-containing gas through the catalyst bed in one reactor at a constant inlet temperature of at least 1000° F. and for a full continuous regeneration period including an initial stage of burning carbonaceous deposit on said catalyst and a subsequent stage of adjusting the temperature pattern of said bed, the oxygen content of said fresh stream remaining constantly in excess of the total amount required for a complete regeneration period in each of said reactors simultaneously on regeneration; passing the oxygen-containing gaseous products of regeneration from said first reactor to the other reactor or reactors on regeneration at substantially the same pressure at which said gaseous products are discharged from said first reactor; and effecting such minor adjustment of the temperature of said gaseous products of regeneration passing between said reactors as may be required to maintain a predetermined gas inlet temperature of at least 1000° F. in said other reactor or reactors.

2. A process as in claim 1 in which said oxygen-containing gas is air.

3. A process as in claim 2 in which said air is heated to a temperature of about 1150° F., and in which said air is introduced into the first reactor in such large volume that the preheated air inlet temperature and the effluent gas outlet temperature of regeneration will differ by not more than 10° to 25° F.

4. A process as in claim 3 in which said minor adjustment of the temperature of said gaseous products of regeneration while passing between said reactors is effected by heating at least a by-pass portion of the gas stream to supply needed additional heat and by introducing additional air into said stream to remove excess heat.

References Cited in the file of this patent

UNITED STATES PATENTS

| | | |
|---|---|---|
| 2,361,182 | Eastman et al. | Oct. 24, 1944 |
| 2,461,838 | Neuhart | Feb. 15, 1949 |
| 2,487,717 | Maker | Nov. 8, 1949 |
| 2,773,014 | Snuggs et al. | Dec. 4, 1956 |